July 5, 1966 H. L. SACHS 3,259,751
STAR TRACKING SYSTEM
Filed July 9, 1962 3 Sheets-Sheet 1

INVENTOR.
Harold L. Sachs
BY Daniel R. Levinson
ATTORNEY.

INVENTOR.
Harold L. Sachs
BY Daniel R. Levinson

ATTORNEY.

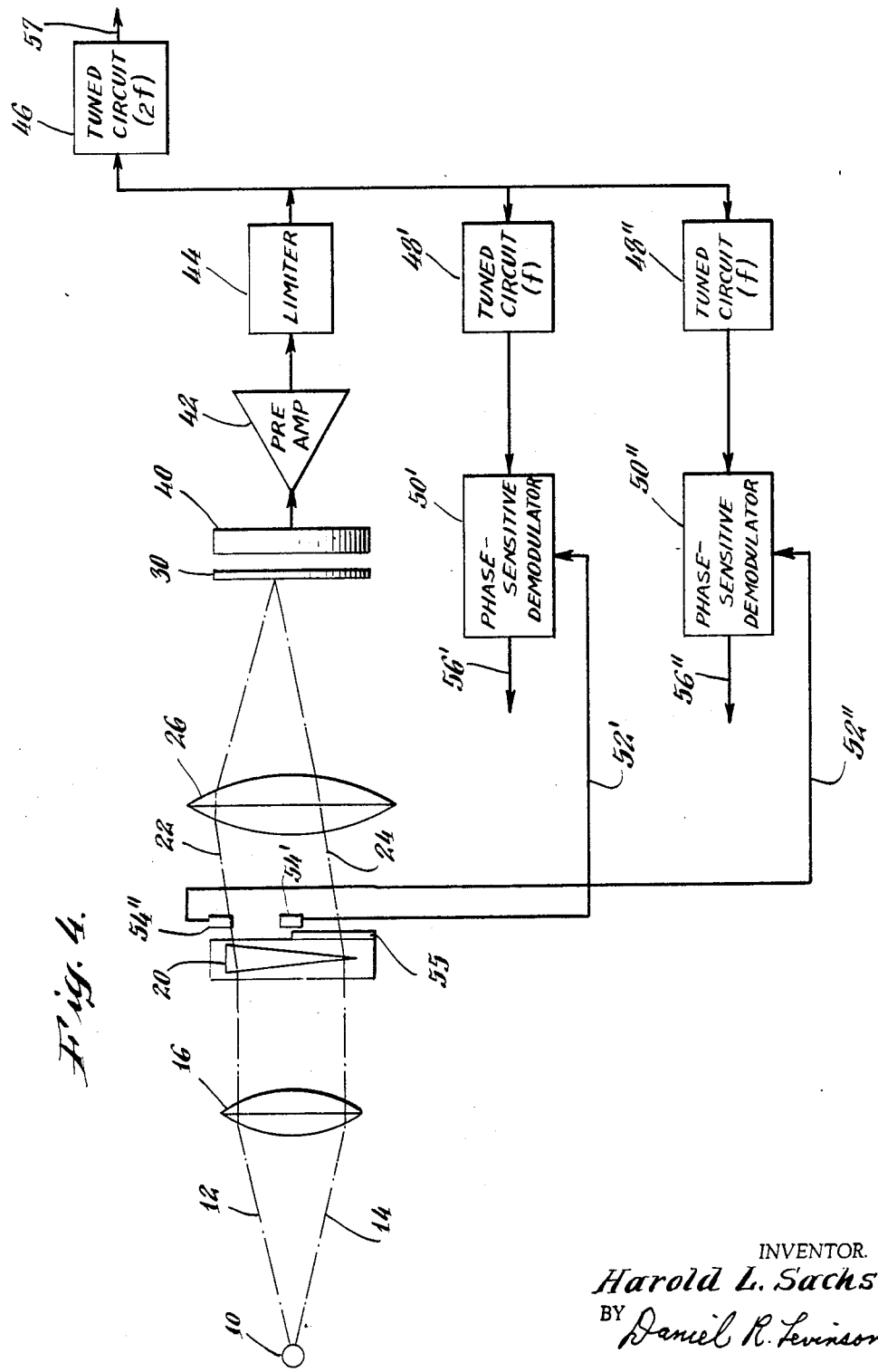

United States Patent Office 3,259,751
Patented July 5, 1966

---

3,259,751
STAR TRACKING SYSTEM
Harold L. Sachs, White Plains, N.Y., assignor to The Perkin-Elmer Corporation, Norwalk, Conn., a corporation of New York
Filed July 9, 1962, Ser. No. 208,364
9 Claims. (Cl. 250—236)

This invention relates to a device for detecting the position of a point source, such as a star, and providing a signal which may be utilized for pointing the device at such a point object.

More specifically the device may utilize a four-quadrant reticle of alternately transparent and opaque sectors of 90° each and a novel single information frequency technique of processing the signals from a detector positioned behind the reticle. The field of view including the point source being monitored is caused to rotate about the optical axis of the device by the use of any convenient optical means, such as optical wedge or mirror, so as to cause an image of the point source to make a circle in the plane of the reticle. As will later appear, when the circle made by the rotating or nutating image has its center on the center of the reticle, then a signal having a certain frequency (say, 2f) will be generated by a detector placed behind the reticle. However, whenever the circle made by the rotating image of the point source being monitored does not completely coincide with the center of the reticle, then a signal having an additional component of a frequency one-half that of the fundamental or previously mentioned signal (i.e., f) will be generated by the detector.

Since, as will be shown in detail hereinafter, the amplitude of this sub-harmonic frequency component is a function of the distance between the center of the circle made by the rotating image point and the center of the reticle, measurement of this amplitude will give a directly useful output, which may be utilized either to indicate the error or to correct the error in pointing of the optical axis of the device relative to the target being monitored. In addition, the phase of this sub-harmonic component will uniquely determine the bearing or polar coordinate angle that the target image makes with some reference line on the reticle.

Although many previous systems, both of the A.M. and F.M. detection type, have been previously proposed for the tracking of a star or similar point image, the invention is believed to be the first to use a single information frequency (namely the above-mentioned subharmonic component) for this purpose. By the utilization of a particular type of reticle and this processing technique, the invention may utilize a much simpler signal processing system than any of the previously known convenient and accurate prior techniques.

An object of the invention therefore is the provision of a device which will monitor the bearing and angular distance of a point source from the optical axis of the device, in which the entire device and especially the electronic signal processing equipment is comparatively simple and inexpensive.

Another object of the invention is the provision of a device for monitoring the position and bearing of a point image, in which a single frequency modulation technique is utilized for processing the detector signal.

A further object of the invention is the provision of a monitoring device of the above type, in which no frequency discriminating circuitry of the pulse width or frequency discriminator type is required, thus reducing the cost and maintenance problems of the entire device.

Other objects and advantages of the invention will become obvious to one skilled in the art upon reading the following specification in conjunction with the accompanying drawings in which.

Figure 1:
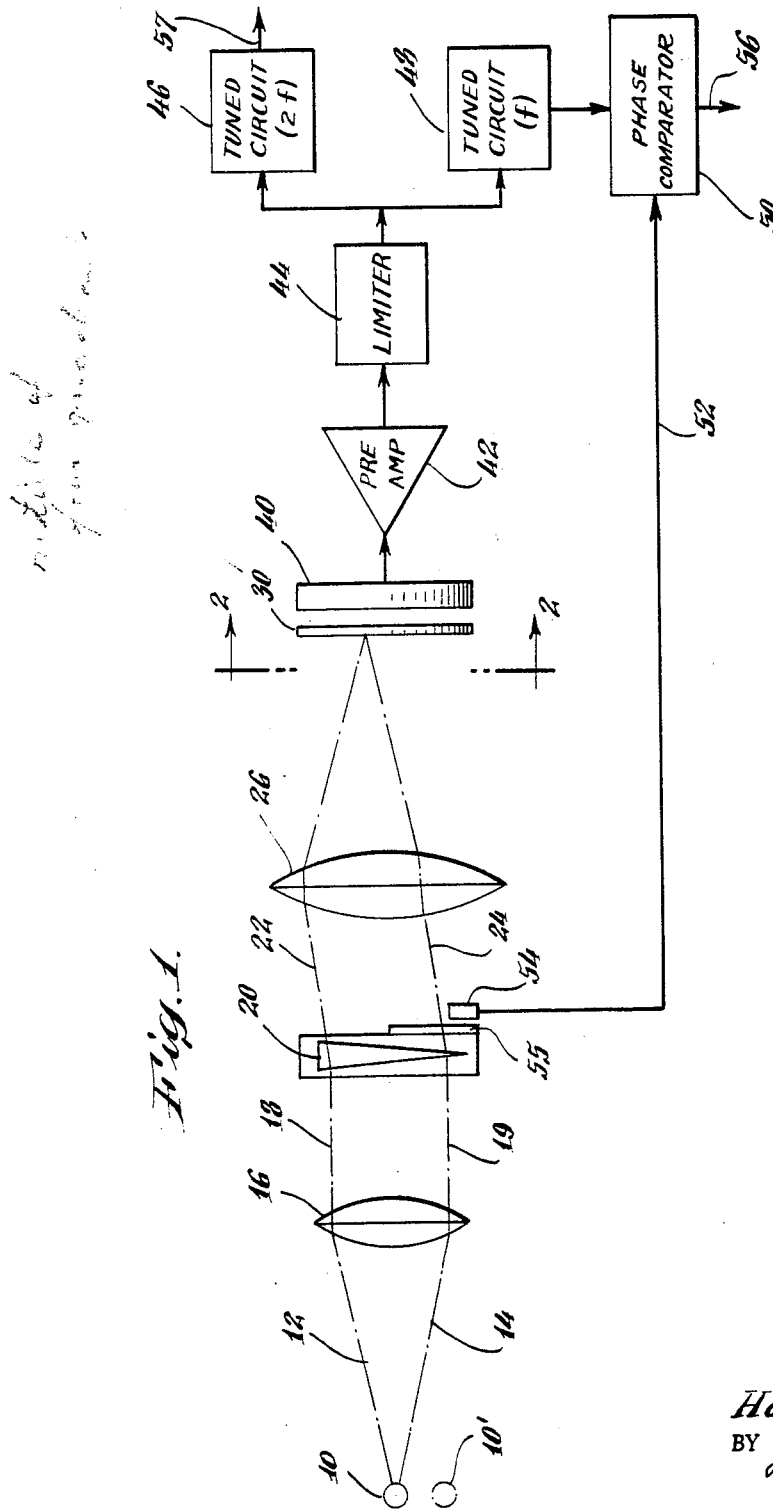
FIG. 1 is a partly diagrammatic and partly schematic representation of the entire device, showing the optical, mechanical and electronic parts.
Figure 2:
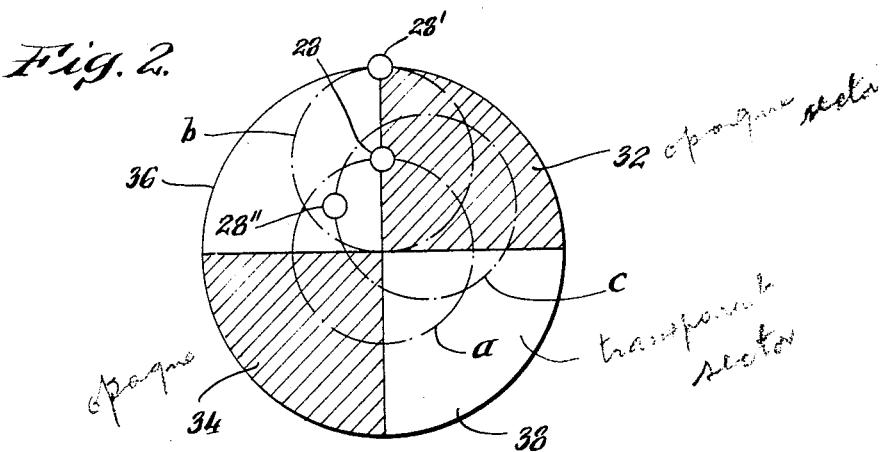
FIG. 2 is a diagrammatic front elevation of the reticle, looking in the direction of the arrows 2—2 in FIG. 1, showing three different possible circular paths of the image of a point object being monitored thereon.
Figure 3A:
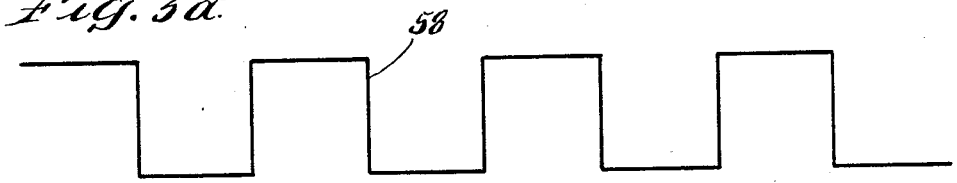
Figure 3B:
Figure 3C:
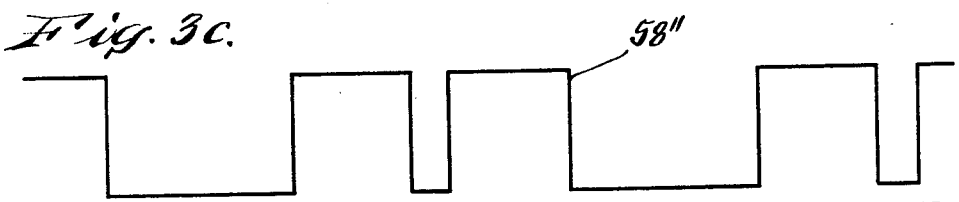

FIGS. 3a, 3b, and 3c are schematic representations of the detector output corresponding to the three circular rotation paths of the point source image, shown in FIGURE 2; and FIG. 4 is an electrical schematic of an alternative signal processing arrangement, yielding the point source position in Cartesian coordinates, rather than in polar coordinates obtained with the FIG. 1 electronic circuitry.

In FIG. 1 the object being monitored is shown as point source 10, radiant energy rays (12, 14) therefrom being collimated by a telescopic or collecting system, schematically shown as a simple collecting lens 16. The collimated rays (18, 19) from the point object are then rotated or nutated by an optical element, exemplified by optical wedge 20, which rotates about the optical axis of the system so as to cause the bundle of rays bounded by ray 22 and ray 24 to nutate or sweep out a hollow cone so as to make a circle with the vertical plane, perpendicular to the plane of the drawing. These nutating parallel rays are then focussed by image-forming lens 26 to form a point image 28 in the plane of reticle 30. This reticle is of a special form, for example, two diametrically opposed 90° opaque sectors and two diametrically opposed 90° transparent sectors interposed therebetween. This reticle is best seen in FIG. 2, wherein the opaque sectors are referenced 32 and 34 while the transparent sectors are labeled 36 and 38.

Should the star or other point object 10 be on the optical axis of the system formed by the optical centers of lenses 16 and 26, the rotation center of wedge 20, and the geometrical center of reticle 30, then the effect of the wedge will be to cause image 28 in the reticle plane to form a circle such as shown at (a) in FIG. 2. Should, however, the star be directly below the optical axis (i.e., in the plane of the paper in FIG. 1 but below centered star 10), such as shown at 10' in FIG. 1, then a circle having its center above the center of the reticle will be generated by the image of the star 28', as shown at (b) in FIG. 2. In FIG. 2 it is assumed that the point source or star being monitored is sufficiently below the optical axis of the system that the circle made by the image 28' on the reticle is just barely contained in the two upper quadrants (32 and 36) of the reticle pattern. A further possible position (more or less random) of the star or other point source being monitored may cause the image (28") thereof to form a circle such as shown at (c) in FIG. 2 by the wedge rotation.

Returning our attention to FIG. 1, it is seen that a detector 40 is positioned behind the reticle 30 so as to receive all of the light that may be passed by this reticle. Although the diagrammatic FIG. 1 shows the detector as being at least as large as the reticle so as to intercept all the light passing through the reticle, it is of course not necessary for the detector to be of such actual physical dimensions. On the contrary, in the practical design of the device a condenser optical system would be placed between the reticle and the detector so as to form a small image of the telescope pupil on the detector of much smaller dimensions. This is desired since the sensitivity of most detectors rises more or less inversely with the square root of area, and therefore a detector area of moderate size is usually advantageous.

The signal generated by detector 40 when activated by the energy passing through the transparent sections of reticle 30 is then amplified by preamplifier 42 and passed to limiter 44. This latter element is simply an amplitude controlling or clipping device positioned in the circuit solely for the purpose of rendering the device relatively insensitive to the absolute magnitude of the point source being monitored. In other words should an extremely bright target source be monitored, the absence of such a device as limiter 44 might allow overloading of the rest of the circuit and perhaps cause a false reading. Obviously this limiter may be quite simple since it may be nothing more than a voltage clipping or limiting circuit.

The amplified but limited output of the detector 40 is then led to two different filter circuits, 46, 48 respectively, which may be simple tuned filters. The circuit 46 is tuned to twice (2f) the fundamental frequency of the rotating optical element, wedge 20, (this rotation frequency being f) as modulated by the 4-quadrant reticle 30. In other words since the frequency of rotation or nutation is f and the reticle will switch on and off this nutated energy twice per revolution of the point source image, the fundamental signal, such as given by a centered point image (see FIG. 2 at a) will be twice the rotation frequency of optical element 20. The other tuned circuit 48 is tuned at the first subharmonic (f) of this fundamental modulated frequency (2f). As may be seen in FIG. 2, when the star or other point object 10' is far removed from the optical axis of the device, the center of the circle (b) its image 28' will make on the reticle is so removed from the center of the latter as to be modulated only once per rotation or nutation of the image field. This is best seen in FIG. 3b where the detector output for the circle (b) of image 28' is shown at 58' and may be seen to have one-half the frequency (f) of the fundamental (2f) modulated image detector signal 58 (FIG. 3a) corresponding to centered image position 28 and its circle (a) in FIG. 2.

Returning once more to FIG. 1, it is seen that the last element following the sub-harmonic tuned circuit 48 is a phase-comparator 50. This phase-comparator may be fed a phase reference signal (at 52) from either a small sensing element 54 monitoring a strip 55 on optical wedge element 20 or from any other type of reference pick-off which will yield this phase information. Therefore the final output of phase comparator 50, shown at 56, will indicate the phase relation of the detector signal relative to a reference point in time. For this reason the angular extent that the star or point image is off the optical axis of the instrument is given (by the amplitude of the output from 48) and its bearings is also contained in output 56 (by the phase relation between the reference detector signal 52 and the signal from detector 40 as processed by the electronic circuit just described).

The final output of the tuned (at fundamental frequency 2f) circuit 46 is obtained at 57, and this output basically will have a fixed amplitude for fixed source position and the parameters of limiter 44 cause the intensity of the monitored point source to be immaterial. For this reason this output 57 of tuned circuit 46 is mainly used in order to determine whether or not a monitored or tracked point source is centered in field of view, since it is obvious that for this condition no subharmonic signal (at frequency (f)) exists in the other circuit (48, 56).

Since the operation of the device has mostly been described in conjunction with the description of FIGS. 1, 2, 3a and 3b, there is no need to repeat much of the operational information at this point. However, the easiest way of understanding the operation of the device is probably afforded by an understanding of the signal generated by the detector (and its processing) for a target position off the optical axis in the rather random manner indicated by the image of the target 28" and its nutation circle c in FIG. 2. This detector signal is illustrated at 58" in FIG. 3c. As may be readily seen by a comparison of this figure with FIGS. 3a and 3b, the detector signal caused by the nutation or rotation of the image 28" of the target (both vertically and horizontally displaced from the optical axis of the device) will be a composite of the fundamental frequency (2f) signal (see FIG. 3a) and the sub-harmonic frequency (f) signal (FIG. 3b). Additionally the two frequency components of FIG. 3c will have different phases than the standard phases of the FIGS. 3a and 3b signals.

Thus, the detector signal for this random position of the target is in essence a modulated A.C. type of signal consisting of the original frequency and a single modulation frequency (in this particular case being a square wave). Because of the fact that such a signal may be readily separated into its two frequency components by the electronic circuit previously described and shown in FIG. 1, the electronic part of the device is much simpler and less expensive than would be required if F.M. frequency modulation were utilized. Further, the noise level and therefore the accuracy is much better than if an A.M. type of signal were utilized. Since the amplitude of the sub-harmonic frequency (f) component in the FIG. 3c signal increases essentially linearly with the displacement of the center of the circle c (and therefore of the point source object being monitored) from the optical axis of the whole device, a simple and accurate read-out is afforded by the device. Similarly, comparatively simple motor hook-ups may be controlled by this output on account of this simple proportionality relationship.

The FIGURE 4 embodiment is similar to the one shown in FIG. 1 in many respects and contains many identical elements which function in substantially the same manner as the same elements in the first figure. For this reason the corresponding elements are referenced with the same reference numerals as used in FIGURE 1, and no repetition of the detailed description of the elements is deemed necessary. Thus, since the signal reaching limiter 40 is identical to that in FIG. 1, tuned circuit 46 (in FIG. 4) functions in the same manner as the correspondingly referenced circuit of FIG. 1. For this reason the final output 57 will give the same information as to whether or not the monitored source is in the field of view.

The other parts of the signal processing system in the FIG. 4 embodiment do differ from the corresponding parts of the FIG. 1 form and will therefore be fully described. The amplified and limited detector signal from limiter 44 is fed to two circuits, 48' and 48", both tuned at frequency (f). Circuit 48' will supply a sharply filtered signal to a first phase-sensitive demodulator 50'. This demodulator will then yield at its output 56' a signal representative of one of the two Cartesian coordinates of the center of the target image circle relative to the optical axis of the system. In order to accomplish this result, a first small sensing element 54' is positioned next to the arcuate strip 55 on optical element 20. More particularly, sensing element 54' is positioned at the same vertical height as the optical axis of the system but offset therefrom by the radius of the arcuate strip 55. Therefore this sensing element will yield a signal every time a edge of the arcuate strip passes through the horizontal plane containing the optical axis of the system. This will cause a reference signal over reference lead 52' to be fed to demodulator 55' every time the optical element 20 reaches a position such that the Y-value thereof is zero. For this reason the first demodulator 50' will yield at its output 56' a signal giving the Y-coordinate of the position of the monitored target relative to the optical axis of the system.

Tuned circuit 48" will receive the same signal from limiter 44 as the circuit just described. Similarly it will separate out the components of this signal having a frequency (f) and feed this filtered signal to phase sensitive demodulator 50". This demodulator will receive a reference signal from the second sensing element 54" by means of second reference lead 52". Since the second sensing element is positioned just above the optical axis, it will generate a signal (caused by the passage of an edge of arcuate strip 55) every time the X-value is zero. Therefore demodulator 50" will yield a signal at its output representative of the X-coordinate of the position of the monitored target relative to the optical axis.

Since the outputs at 56' and 56" together will yield the Y- and X-coordinates, respectively, of the point source relative to the central position (on the optical axis), these two outputs, taken together, uniquely determine the exact position of the point source in the field of view relative to the optical axis in a Cartesian coordinate system having its origin on the optical axis. Since these outputs are substantially linear with the Y and X values of the position of the target source relative to the optical axis of the entire device, the FIG. 4 output signals are especially adaptable for supplying the necessary correction signal to control motors which may automatically reposition either the monitoring device itself or another mechanism (such as a telescope, an anti-aircraft gun or the like) so as to track the target source.

Many different modifications to the various elements and subcombinations of the optical system utilized in both embodiments may be made without departing from the heart of the invention. For example, instead of using an optical wedge, a rotating canted mirror or other similar means for nutating the field may be utilized instead. In fact, means other then optical may be used for this purpose. For example, an image-forming electronic tube may be used as the optical system, in which case the means for nutating the field would comprise electronically regulated deflection means surrounding the electron beam carrying the image. As may be readily determined from the schematic nature of the optical system illustration, none of the elements themselves are highly critical and various equivalents may be used therefor. Similarly equivalent elements and subcombinations may be used in either of the two signal processing circuits illustrated in FIGS. 1 and 4.

Because of the abovementioned alternative arrangements, the invention is not limited to any of the particular elements or subcombinations specifically described or illustrated, but rather is defined by the scope of the appended claims.

I claim:

1. A monitoring device for determining the position of a target object in the field of view of the monitoring device comprising:

means for nutating said field of view including said target object about a nutation axis at a certain fundamental rotation frequency;

a reticle positioned in the radiant energy of said nutating field view with its center on said nutation axis, said reticle having a pattern which is symmetrical about its center and includes at least one obscuring and at least two transmitting sectors;

said reticle therefore modulating light from said target object, when it is in the center of said field of view so as to form a circle centered with respect to said nutation axis and therefore the center of said reticle, at a fully modulated frequency equal to the number of transmitting sectors times said fundamental nutation frequency;

light from said target object, when not so centered, being passed by said reticle at least partially at a lesser frequency than said full modulated frequency;

detector means, positioned behind said modulating means, thereby receiving said modulated radiant energy, said detector therefore producing a signal containing components at both said fully modulated frequency and said lesser frequency when said target object is at a distance from said center of said field of view;

and means for deriving solely from said lesser frequency component of said detector signal an output containing information as to the magnitude and direction of the monitored position of said object from said centered position.

2. A monitoring device according to claim 1, in which:
said reticle comprises two diametrically opposed pairs of 90° sectors;
one pair being substantially transparent and the other pair being substantially opaque to some form of radiant energy.

3. A monitoring device according to claim 1, in which:
said lesser frequency component is one-half the frequency of said fully modulated frequency.

4. A monitoring device according to claim 1, in which:
said deriving means comprises at least one sharply tuned circuit.

5. A monitoring device according to claim 1, in which:
said deriving means is of such construction as to yield an output in which said information is in polar coordinates.

6. A monitoring device according to claim 1, in which:
said deriving means is of such construction as to yield an output in which said information is in Cartesian coordinates.

7. A monitoring device according to claim 1, in which:
said deriving means comprises at least one phase-sensitive demodulator.

8. A monitoring device according to claim 1, in which:
said deriving means comprises a phase comparator.

9. A monitoring device according to claim 1, in which:
said lesser frequency component has the same frequency as said fundamental rotation frequency of the field of view nutation.

References Cited by the Examiner
UNITED STATES PATENTS

| | | | |
|---|---|---|---|
| 2,939,962 | 6/1960 | Miller | 250—203 |
| 2,943,204 | 6/1960 | Greenlee et al. | 250—203 |
| 2,947,872 | 8/1960 | Carbonara et al. | 250—203 |
| 2,967,247 | 1/1961 | Turck | 250—203 |
| 2,968,735 | 1/1961 | Kaufold et al. | 250—203 |
| 2,981,843 | 4/1961 | Hansen | 250—203 |
| 3,080,484 | 3/1963 | Hulett | 250—203 |

RALPH G. NILSON, *Primary Examiner.*

J. D. WALL, *Assistant Examiner.*